United States Patent

[11] 3,621,932

| [72] | Inventors | Edward Gunston Tattersall<br>Hythe, Southampton;<br>Peter Riddett, Sarisbury Green, Southampton; Ronald Christopher Fishlock, Totton, Southampton, all of England |
|---|---|---|
| [21] | Appl. No. | 824,960 |
| [22] | Filed | May 15, 1969 |
| [45] | Patented | Nov. 23, 1971 |
| [73] | Assignee | Hovermarine Transport Ltd.<br>Woolston, Southampton, England |
| [32] | Priority | May 17, 1968 |
| [33] | | Great Britain |
| [31] | | 23,522 |

[54] GAS-CUSHION VEHICLES
14 Claims, 8 Drawing Figs.

[52] U.S. Cl.................................. 180/126,
114/67 A, 180/127
[51] Int. Cl.................................. B60v 1/04,
B60v 1/16

[50] Field of Search......................................... 180/126, 127, 128

[56] References Cited
UNITED STATES PATENTS

| 3,191,705 | 6/1965 | Jones et al. | 180/126 |
| 3,384,197 | 5/1968 | Bingham et al. | 180/128 X |
| 3,444,952 | 5/1969 | Clarke | 180/127 |
| 3,478,836 | 11/1969 | Eckered et al. | 180/128 |
| 3,502,168 | 3/1970 | Jones | 180/127 |

*Primary Examiner*—A. Harry Levy
*Attorney*—Cushman, Darby and Cushman

ABSTRACT: An air-cushion vehicle for operation over water has the front end of the vehicle-supporting cushion contained by a two-stage flexible skirt of inflatable construction. The skirt comprises a row of contiguously disposed flexible members of U-like plan form flexibly suspended beneath the body of the vehicle by inner and outer flexible walls. The outer flexible wall has a rearward rake. The arrangement reduces forces generated due to impact between waves and the vehicle.

PATENTED NOV 23 1971

Inventors
Edward Gunston Tattersall
Peter Riddett
Ronald Christopher Fishlock
By Cushman, Darby & Cushman
Attorneys

PATENTED NOV 23 1971 3,621,932

Inventors
Edward Gunston Tattersall
Peter Riddett
Ronald Christopher Fishlock
By Cushman, Darby & Cushman
Attorneys

GAS-CUSHION VEHICLES

This invention relates to gas-cushion vehicles, that is to say, to vehicles for travelling over a surface and which, in operation, are supported above that surface, at least in part, by a cushion of pressurized gas, for example, air formed and contained between the vehicle body and the surface.

The vehicle-supporting cushion may be contained for at least part of its periphery by a flexible wall or skirt attached to and depending from the vehicle body.

When gas-cushion vehicles operate over water surfaces they often encounter waves which are large enough to give rise to forces generated due to impact between the waves and the vehicle and which can result in damage to the vehicle as well as discomfort to any passengers who may be travelling in the vehicle.

The present invention has, for one of its objects, the provision of a gas-cushion vehicle with a flexible skirt which is capable of absorbing at least some of the forces resulting from impact between the waves and the vehicle.

According to one aspect of the invention the vehicle-supporting cushion of a gas-cushion vehicle is, in operation of the vehicle, contained, at least in part, by a flexible skirt comprising a succession of contiguous wall members flexibly suspended beneath the vehicle body by outer flexible wall means extending downwardly and inwardly relative to the cushion from the vehicle body to outer parts of the wall members and inner flexible wall means extending, downwardly and outwardly relative to the cushion, from the vehicle body to inner parts of the wall members, the space between the inner and outer wall means defining a chamber, means for supplying pressurized gas to said chamber, and means for allowing a through-flow of gas from the chamber to the space occupied by said vehicle-supporting cushion.

According to another aspect of the invention, the vehicle-supporting cushion of a gas-cushion vehicle is, in operation of the vehicle, contained at least in part by a flexible skirt of inflatable form comprising a succession of contiguous wall members flexibly suspended beneath the vehicle body by flexible wall means extending downwardly and inwardly relative to the cushion so as to connect the vehicle body with outer parts of the wall members and flexible means extending downwardly and outwardly relative to the cushion so as to connect the vehicle body with inner parts of the wall members.

According to yet another aspect of the invention, the vehicle-supporting cushion of a gas-cushion vehicle for operation over water is, in operation of the vehicle, contained by front, rear and sidewall structures which depend from the vehicle body, the front wall structure comprising upper and lower wall parts, the lower wall part being formed by a succession of contiguous wall members each comprising a lateral portion and a pair of inwardly extending side portions so that the wall members each define a concavity, the hollow of which is presented towards said cushion, the upper wall part comprising flexible wall means extending between the lateral portions of the wall members and a point above that from which either of the side-disposed wall structures depend from the vehicle body so as to cover a front end portion of the vehicle body and so as to define a space with said front end portion, means connecting the side portions of the wall members to the vehicle body and means for supplying pressurized gas to said space so as to inflate said flexible wall means whereby the inflated flexible wall means serves to absorb forces resulting from impact between waves and the vehicle.

The various aspects of the invention will now be described by way of example with reference to the accompanying drawings wherein.

Figure 1:
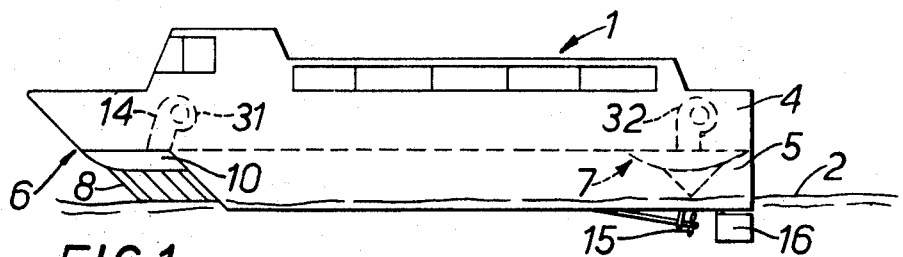
FIG. 1 is a side view of a gas-cushion vehicle.

With reference to FIGS. 1 to 4, a gas-cushion vehicle 1 of the "sidewall" type is shown travelling over the surface 2 of water and is supported above the surface 2 by a cushion 3 of pressurized air formed and contained between the vehicle body 4 and the surface. The vehicle 1 is propelled by a pair of water-screw propellers 15 and is steered by a pair of rudders 16.

The sides of the vehicle-supporting cushion 3 are contained by a pair of laterally spaced rigid (side) wall structures 5 extending longitudinally along the sides of the vehicle body in directions substantially parallel to the fore-and-aft axis of the vehicle body and depending from the sides of the latter so as to dip into the water 2 and form a cushion seal. Each sidewall 5 carries a water-screw 15 and a rudder 16. The front or bow end of the cushion 3 is contained by a flexible skirt 6 and the rear or stern end thereof by a flexible skirt 7. The skirts 6, 7 which are of lightweight rubberized fabric, extend laterally between the ends of the sidewalls, are attached to the vehicle and depend therefrom to be in light contact with the water surface 2.

The front flexible skirt 6 comprises a succession of independently deflectable flexible wall or skirt members 8 of the form disclosed by U.S. Pat. No. 3,420,330. The wall members 8 are flexibly suspended from the bottom 9 of the vehicle body 4 by outer flexible wall means 10 extending downwardly and inwardly (i.e., rearwardly), relative to the cushion 3, in a smooth curve from the vehicle body to the outer, upper parts of the wall members 8, and by inner flexible wall means 11 extending downwardly and outwardly relative to the cushion from the vehicle body 4 to the inner, upper parts of the wall members 8. The space between the inner and outer wall means 11, 10 defines a chamber 13 and supply ducts 14 supply pressurized inflation air to the chamber 13. Outlet means 12 defined by the wall members 8 allow a downward and rearward through-flow of air from the chamber 13 to the space occupied by the vehicle-supporting cushion 3, i.e., the cushion space of the vehicle.

Figure 3:
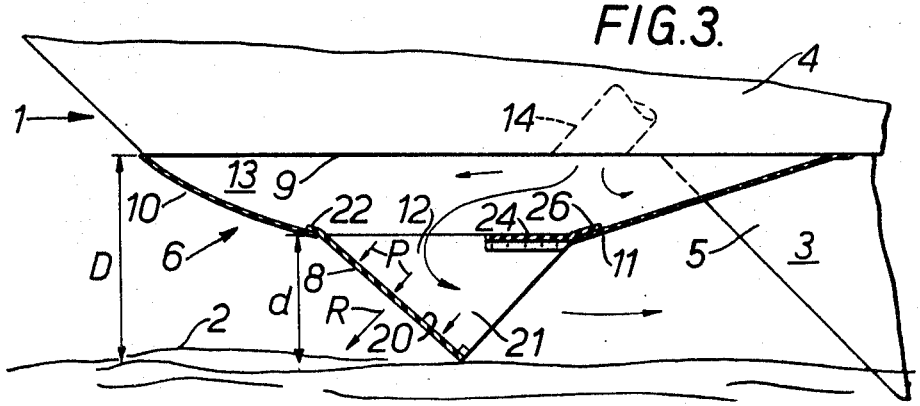
FIG. 3 is a section taken on the lines III—III of FIG. 2.

With particular reference now to FIG. 3, each flexible wall member 8 comprises a generally triangular sheet of rubberized fabric folded over to provide a downwardly and inwardly extending middle or lateral portion 20 flanked by two side portions 21 extending inwardly and upwardly from the middle portion 20. Thus, each wall member 8 defines a concavity, the hollow of which is presented to the cushion 3. As the hollows of the concavities are open to the cushion 3, the wall members are inflated by cushion air. The side portions 21 of the wall members 8 serve as ties to transfer inflation loads P, acting normal to the portions 20, to the sheets 10 and 11. The resultants R of the inflation loads P acting on the lateral portions of the wall members lie on imaginary lines R passing upwardly between the points of attachment of the wall members 8 to the flexible wall means 10, 11 and also between the points of attachment of the latter to the vehicle body 4. The bottom corners of the side portions 21 make an angle of substantially 90° with the bottom of the associated middle portion 20. The upper ends of the concavities of the wall members 8 are open to the space between the inner and outer wall means 10, 11, i.e., open to the chamber 13, and thus define the outlet means 12. As indicated by the arrow 17, the flow of inflation air from the chamber 13 to the cushion space 3 passes through these concavities.

Figure 4:
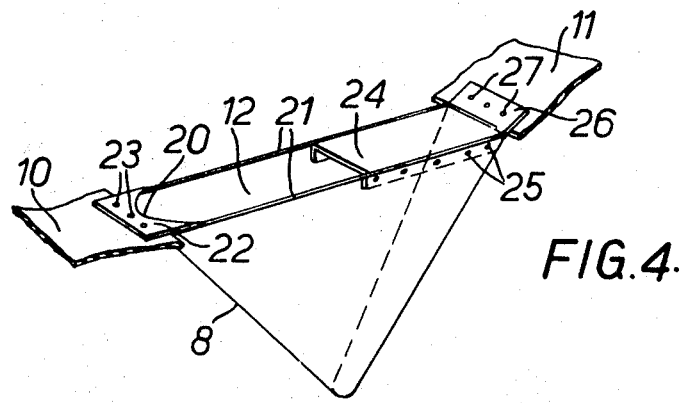
FIG. 4 is a view in perspective of part of the flexible skirt.

As shown in FIG. 4, the upper end of the middle portion 20 is provided with an integral, tonguelike flexible extension 22 demountably attached to the inner or bottom edge of the outer wall means 10, and on the inner surface thereof, by short lengths of nylon rope 23. The inner, upper corners of the side portions 21 of each wall member 8 carry a flexible component 24 comprising a generally rectangular sheet of flexible (rubberized fabric) material with opposite longitudinal edges folded over as shown to provide "flanges" which are demountably attached to the rearward parts of the side portions 21 by nylon rope 25 so that each component is disposed across the upper edges of the side portions 21. The component 24 is provided with an integral, tonguelike flexible extension 26 demountably attached to the inner wall means 11 by short lengths of nylon rope 27. The components 24 have two functions; they serve as barrier means to restrict air outflow through the concavities of the wall members 8 and they also serve to limit excessive inward deflection of the wall members 8 should they tend to enter the chamber 13 due to impact with large waves or due to the vehicle settling on the water 2 when "off-cushion."

The vertical depth $d$ of each wall member (see FIG. 3) is about 60 percent of the total vertical depth $D$ of the flexible skirt 6.

Figure 2:
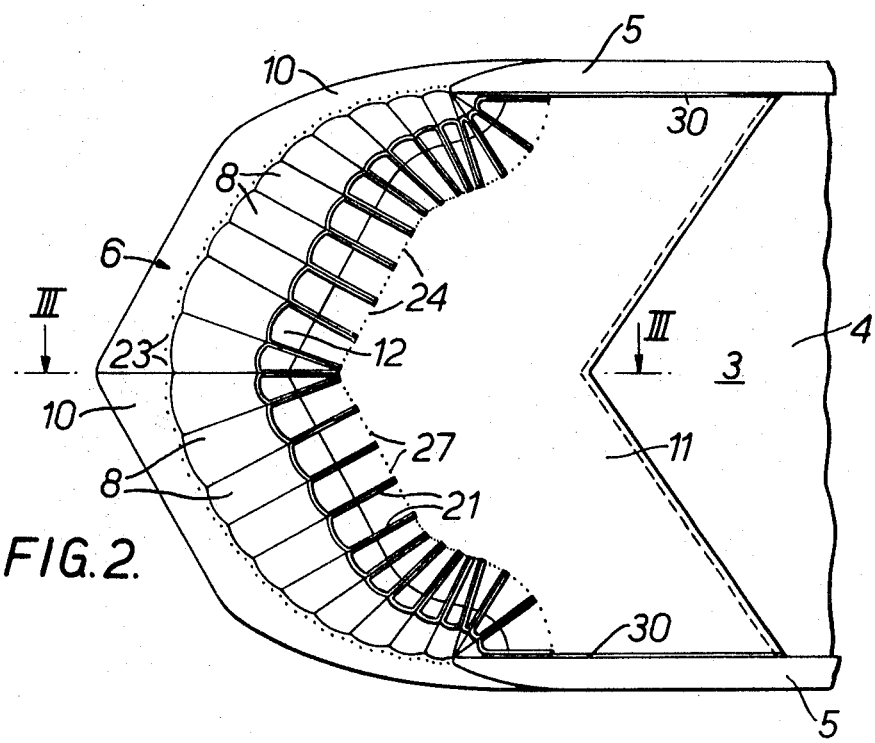
FIG. 2 is an inverted plan view, to an enlarged scale, of the bow end of the vehicle.

With particular reference to FIG. 2, the wall members 8 are disposed in a contiguous row extending in a substantially smooth curve extending outwardly of the bow ends of the sidewalls 5, the major part of the row being substantially partcircular between the sidewalls 5. Compared with a row of wall members 8 disposed substantially normal to the axes of the sidewalls 5, the bowlike arrangement of FIG. 2 provides the vehicle with increased cushion area and also reduces wave drag.

It will be noted that the side portions 21 of each of the wall members 8 are not, at least for the most part, disposed substantially parallel to each other but are disposed so that some converge and some diverge. The particular disposition of the side portions 21 results in an efficient transfer of inflation forces from the wall members 8 to the flexible wall means 10, 11, particularly the latter. It will also be noted that there is little or no overlap of the side portions 21 at the front ends of adjacent wall members 8. This "even" distribution avoids unwanted side-bulging of one wall member 8 over its immediate neighbor which, inter alia, tends to impede the latter from returning to its original position after inward deflection.

Figure 5:
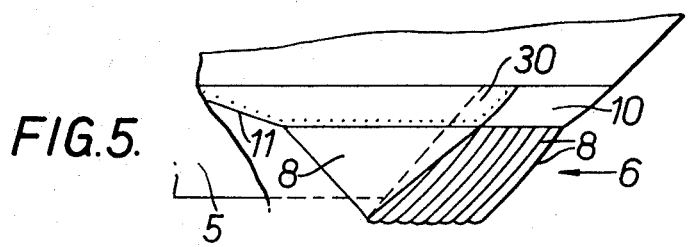
FIG. 5 is a cutaway portside view of the bow end of the vehicle.

As best shown in FIG. 5 adjacent outer ends of the wall means 10, 11 are air sealed by panels 30 of rubberized fabric extending longitudinally therebetween. Air inflating the space 13 between the wall means 10, 11 presses the flexible panels 30 against the inner side faces of the sidewalls 5.

With reference now to FIG. 1, the front skirt 6 is inflated by a pair of centrifugal fans 31 to which the ducts 14 are connected and the rear skirt 7 by a single centrifugal fan 32. The rear skirt 7 is substantially similar to the front skirt 6 save that instead of employing single wall members 8, the skirt 7 uses pairs of wall members disposed in interfitting relationship, as disclosed in British Pat. No. 1,109,562.

In operation, as best shown in FIG. 3, pressurized air supplied by the ducts 14 inflates the chamber 13 between the flexible wall means 10, 11 and, after escaping through the outlet means 12, flows downwardly and rearwardly through the hollows of the wall members 8 to inflate them and to enter the space occupied by the cushion 3 so as to maintain cushion pressure. The flexible skirt 6 is of two-stage form wherein the upper stage is formed by the inflated inner and outer flexible wall means 10, 11 and the lower stage by the flexible wall members 8. The contiguous wall members 8 deflect independently to accommodate small waves while the inflated upper stage serves as a buffer to reduce the magnitude of force caused by impact between large waves and the vehicle.

The pronounced rearward slope of the outer flexible wall means 10 provides a substantial contribution to the reduction of wave-induced impact forces whereby the possibility of damage to the vehicle 1 is reduced and is also the possibility of discomfort to any passengers in the vehicle.

If required, the upper stage of the flexible skirt 6 can be "stiffened" by reducing the cross-sectional areas of the outlet means 12 so as to increase the pressure of inflation air in the space 13. This is done by increasing the longitudinal dimensions of the components 24.

Figure 6:
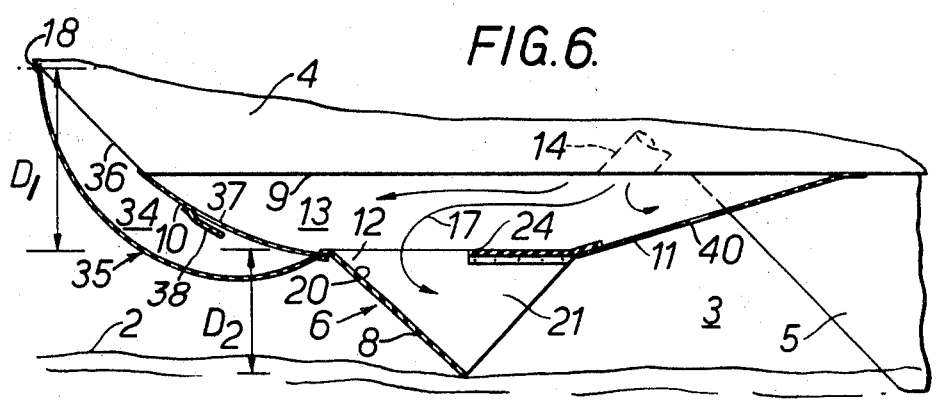
FIGS. 6, 7 and 8 are views similar to FIG. 3 and illustrate three different modifications.

With reference now to FIG. 6, a third wave-shock-absorbing stage can be added to the flexible skirt 6 which comprises an inflated bag 35 of rubberized fabric extending in an outwardly bulging curve, between the bow 36 of the vehicle and the upper ends of the wall members 8. The bag 35 is inflated by air flowing into the bag by way of one or more ports 37 in the outer wall means 10. To provide a very "stiff" bag when meeting large waves, reverse flow through the port 37 may be prevented by the provision of a nonreturn flap-valve 38 on the bag side of the port. The valve 38 may incorporate a small diameter bleed hole to prevent the buildup of too much pressure in the bag 35.

The arrangement illustrated by FIG. 6 provides a gascushion vehicle for operation over water wherein, in operation, the vehicle-supporting cushion is contained by front (6 and 35), rear (7) and side (5) wall structures which depend from the vehicle body 4. The front wall structure comprises upper and lower wall parts, the lower wall part being formed by the succession of contiguous wall members 8 and the upper wall part comprising supplementary flexible wall means formed by the bag 35. The material of the bag 35 extends upwardly and forwardly from the lateral portions 20 of the wall members 8 and a point 18. The point 18 is above the bottom surface 9 of the vehicle body 4 which is where both the sidedisposed wall structures 5 depend from the vehicle body 4. The bag 35 is disposed so as to cover the rearwardly sloping extreme bow end portion of the vehicle body and defines a space or chamber 34 with this front end portion.

It will be noted that the vertical distance $D_1$ between the point 18 and the upper ends of the lateral portions 20 of the wall members 8 is significantly greater than the vertical distance $D_2$ between the upper and lower ends of the lateral portions. Actually $D_1$ is about 1.5 5 times $D_2$.

In a (nonillustrated) modification, the flap-valve 38 is replaced by a ring of flexible wall members similar in form to the wall members 8. The hollows of the wall members would face the interior of the bag 35 so that they would deflect to allow the inflow of inflation air to the bag 35 but would inflate to seal off the port 37 when pressure within the bag 35 exceeds pressure in the space 13.

In order to "prime" the cushion space when the vehicle 1 is on the water "off-cushion," with the flexible skirts 6, 7 collapsed beneath the vehicle body, the inner flexible wall means may be provided with additional outlet means in the form of one or more ports 40. This modification (which may also be applied to the arrangement shown in FIG. 3) also ensures a flow of air to the cushion 3 when impact between waves and the wall members 8 causes the latter to deflect inwardly to an extent whereby the flow of air through the openings 12 is interrupted.

Figure 7:
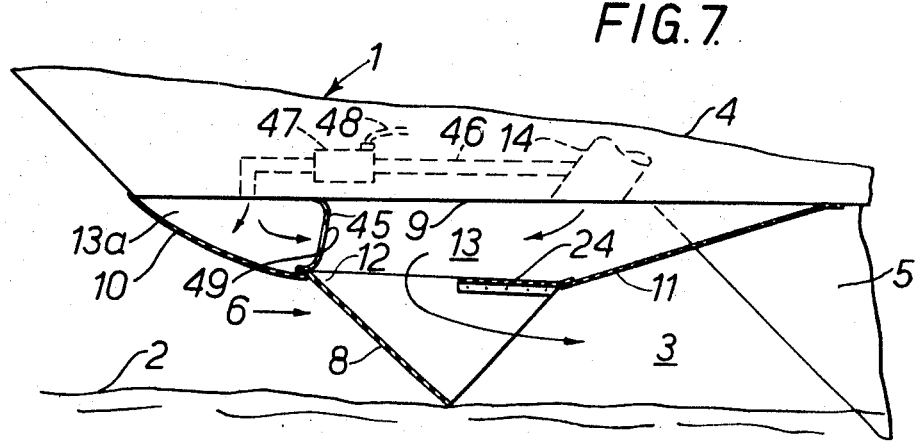

With reference now to FIG. 7, the space 13 can be divided internally into two separate compartments by integral flexible wall means 45 extending between the bottom surface 9 of the vehicle body 4 and the inner parts of the wall members 8. The subsidiary space 13a defined by the wall means 10, 45 is inflated to above that pressure existing in the remainder of the space 13 by air tapped off the duct 14 by a branch 46 and boosted by a compressor 47 connected in the branch. The compressor, which is of variable output, is under the control, through electrical signal lines 48, of the pilot of the vehicle. To prevent too high a buildup in inflation pressure should the wall means 10 be subjected to impact by large waves the flexible wall means 45 is provided with a restricted flow orifice 49 whereby air can enter the remainder of the space 13.

The arrangement of FIG. 7, which provides a further stage of suspension, can be added to either or both of the arrangements of FIG. 3 and 6. The cushion feed arrangement 40 of FIG. 6 may be used with the arrangement of FIG. 7, if desired.

Figure 8:
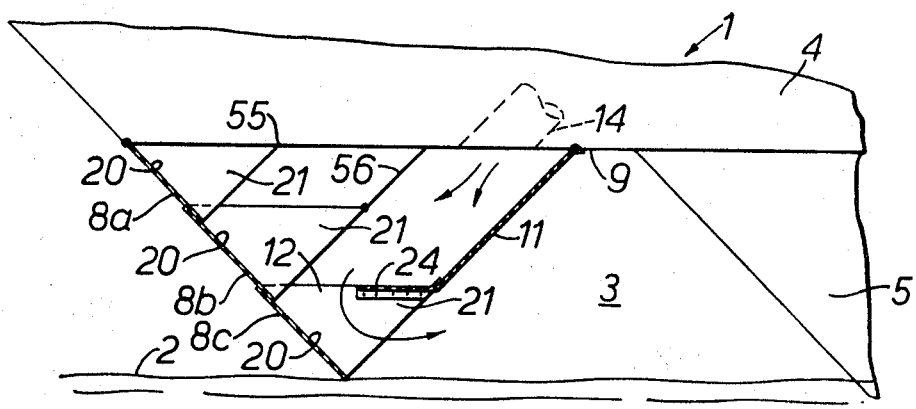

With reference now to FIG. 8, the flexible wall means 10 may be replaced by two series of wall members 8a, 8b, each similar in form to the wall members 8. In this example the wall members 8 are replaced by the smaller wall members 8c. The bottom portions of the wall members 8a extend slightly into the hollows of the wall members 8b disposed immediately below, similarly the wall members 8b into the hollows of the wall members 8c beneath them. The inner, upper corners of the side portions 21 of the wall members 8a are attached directly to the bottom surface 9 of the vehicle body at points 55 and those of the wall members 8b indirectly thereto by tiecords 56. The flexible sheet means 11 may or may not have cushion feed ports 40 (see FIG. 6). If desired, either or both of the wall members 8a, 8b may be closed off by panels of flexible material extending between the inner edges of their side portions, and the internal spaces so defined may be inflated independently in the manner of the space 13a of FIG. 7.

The arrangement of FIG. 8 provides a very flexible skirt arrangement, the wall members 8a, 8b providing an outer flexible wall means extending downwardly and rearwardly relative to the cushion 3 in a manner similar to the wall means 10 of FIGS. 1 to 7. Although shown "straight" in FIG. 8, in practice, the middle portions 20 of the wall members 8a, 8b will bulge outwardly under inflation pressure so that the wall they define extends in a smooth curve between the bottom surface 9 and the wall members 8c. The arrangement also provides a substantial saving in flexible sheet material compared with that used by a flexible skirt comprising a series of large wall members 8 extending downwardly from the bottom surface 9 to the water 2 below.

In another (nonillustrated) modification of the invention the space 13a (FIG. 7) and the space defined by the bag 35 (FIG. 6) may be wholly or partly filled with a resilient material such as sorbo rubber.

If desired, air curtains may be used in combination with the flexible skirts so as to contain cushion air.

Any of the above-described skirts may be used to contain sides and/or rear parts of the cushion 3 in addition to the front part thereof.

We claim:

1. A gas-cushion vehicle for operation over water wherein, in operation, the vehicle-supporting cushion is contained by front, rear and sidewall structures which depend from the vehicle body, the front wall structure comprising upper and lower wall parts, the lower wall part being formed by a succession of contiguous wall members each comprising a lateral portion and a pair of inwardly extending side portions so that the wall members each define a concavity, the hollow of which is presented towards said cushion, the upper wall part comprising flexible wall means extending between the lateral portions of the wall members and a point above that from which either of the side-disposed wall structures depend from the vehicle body so as to cover a front end portion of the vehicle body and so as to define a space with said front end portion, tie means connecting the side portions of the wall members to the vehicle body and means for supplying pressurized gas to said space so as to inflate said flexible wall means whereby the inflated flexible wall means serves to absorb forces resulting from impact between waves and the vehicle.

2. A vehicle as claimed in claim 1 wherein the sidewall structures are of rigid construction.

3. A vehicle as claimed in claim 1 wherein the said tie means connecting the side portions of the wall members to the vehicle body comprise flexible wall means.

4. A vehicle as claimed in claim 1 wherein the flexible wall means forming said upper wall part extends from said point, downwardly and rearwardly, to the lateral portions of the wall members.

5. A vehicle as claimed in claim 1 wherein the means for supplying pressurized gas to said space comprise nonreturn valve means.

6. A vehicle as claimed in claim 1 wherein the vertical distance between said point and the upper ends of the lateral portions of said wall members is greater than the vertical distance between the upper and lower ends of said lateral portions.

7. A gas-cushion vehicle wherein, in operation, the vehicle-supporting cushion is contained, at least in part, by a flexible wall structure comprising upper and lower wall parts, the lower wall part being formed by a succession of contiguous wall members each comprising a lateral portion and a pair of inwardly extending side portions so that the wall members each define a concavity, the hollow of which is presented towards said cushion, the upper wall part comprising outer flexible wall means extending between the lateral portions of the wall members and one part of the vehicle body and inner flexible wall means extending between said side portions of the wall members and another part of the vehicle body, the space between the inner and outer wall means defining a chamber, internal flexible wall means extending downwardly from the vehicle body and between the said inner and outer wall means so as to divide said chamber into inner and outer compartments, means for supplying pressurized gas to one of said compartments and means for allowing a controlled flow of gas from said one compartment to the other of said compartments.

8. A vehicle as claimed in claim 7 wherein said means for allowing a controlled flow of gas from said one compartment comprise nonreturn valve means.

9. A gas-cushion vehicle wherein, in operation, the vehicle-supporting cushion is contained, at least in part, by a flexible skirt comprising a succession of contiguous wall members flexibly suspended beneath the vehicle body by outer flexible wall means extending, downwardly and inwardly relative to the cushion, from the vehicle body to outer parts of the wall members, and inner flexible walls means extending, downwardly and outwardly relative to the cushion, from the vehicle body to inner parts of the wall members, the space between the inner and outer wall means defining a chamber, means for supplying pressurized gas to said chamber, and means for allowing a through flow of gas from the chamber to the space occupied by said vehicle-supporting cushion, said chamber having laterally disposed flexible barrier means dividing said space between the inner and outer wall means into inner and outer compartments.

10. A vehicle as claimed in claim 9 having means for inflating the outer compartment to a higher pressure than that to which the inner compartment is inflated.

11. A vehicle as claimed in claim 9 provided with means for allowing a flow of inflation gas between the inner and outer compartments.

12. A gas-cushion vehicle wherein, in operation, the vehicle-supporting cushion is contained, at least in part, by a flexible wall structure comprising upper and lower wall parts, the lower wall part being formed by a succession of contiguous wall members each comprising a lateral portion and a pair of inwardly extending side portions so that the wall members each define a concavity, the hollow of which is presented towards said cushion; the upper wall part comprising inner and outer flexible wall means extending between the lateral portions of the wall members and spaced-apart portions of the vehicle body so as to define a chamber, means for supplying pressurized gas to said chamber and flexible tie means extending between the side portions of the wall members and the vehicle body, wherein the resultant of the cushion-gas inflation loads acting on the lateral portions of the wall members lie on imaginary lines passing upwardly between the points of connection of the inner flexible wall means and said flexible tie means to the wall members, and said vehicle-supporting cushion having sides which are contained by sidewall structures which depend from the vehicle body, said outer wall means being attached to the vehicle body at a level above that from which said sidewall structures depend from said vehicle body.

13. A vehicle as claimed in claim 12, wherein said sidewall structures are of rigid construction.

14. A gas-cushion vehicle wherein, in operation, the vehicle-supporting cushion is contained, at least in part, by a flexible skirt comprising a succession of contiguous wall members flexibly suspended beneath the vehicle body by outer flexible wall means extending, downwardly and inwardly relative to the cushion, from the vehicle body to outer parts of the wall members, and inner flexible wall means extending, downwardly and outwardly relative to the cushion, from the vehicle body to inner parts of the wall members, the space between the inner and outer wall means defining a chamber, means for supplying pressurized gas to said chamber, and means for allowing a through flow of gas from the chamber to the space occupied by said vehicle-supporting cushion, and said flexible skirt containing cushion gas at the forward end of the vehicle, and being provided with supplementary flexible wall means disposed forwardly of said outer wall means of said skirt and extending upwardly from said flexible wall members to a point on the forward end of the vehicle body which is above the bottom of the vehicle body so as to cover a forward end portion of said body and so as to define a chamber with said forward end portion and said supplementary flexible wall means being inflated by the pressurized gas supplied to said chamber whereby said supplementary flexible wall means serves to absorb forces resulting from impact between waves and the vehicle.

* * * * *